Dec. 10, 1957   J. POLARD ET AL   2,815,564
COMB DEVICE FOR MACHINES FOR INSERTING COILS IN
THE SLOTS OF STATORS OF ELECTRICAL MACHINES
Filed July 10, 1953   3 Sheets-Sheet 1

Dec. 10, 1957 J. POLARD ET AL 2,815,564
COMB DEVICE FOR MACHINES FOR INSERTING COILS IN
THE SLOTS OF STATORS OF ELECTRICAL MACHINES
Filed July 10, 1953

United States Patent Office 2,815,564
Patented Dec. 10, 1957

2,815,564

COMB DEVICE FOR MACHINES FOR INSERTING COILS IN THE SLOTS OF STATORS OF ELECTRICAL MACHINES

Jean Polard, Saint-Germain-en-Laye, and René Herbrecht, Paris, France, assignors to Société Anonyme dite: Compagnie Electro Mecanique, Paris, France Application July 10, 1953, Serial No. 367,279

Claims priority, application France December 2, 1952

1 Claim. (Cl. 29—205)

In machines for inserting coils in the slots of stators of electrical machines, for example in a machine such as the one disclosed in the U. S. Patent No. 2,506,173, filed on November 4, 1948, the transfer of the coils from the dummy rotor to the stator slots is effected by means of telescopically interfitting tubular members, and when this transfer is completed the stator coils heads are formed by means of members called hereafter "comb devices" which serve the purpose of giving to these coils heads the desired axial and radial dimensions.

Now this invention provides a so-called comb device of the type broadly set forth hereabove, whereby the desired purpose is fulfilled without any risk of damaging the coil-forming wires.

To this end four essential conditions must be adhered to, and it will be seen that when these conditions are strictly observed the comb device will have a definite shape, otherwise various inconveniences will occur; these conditions are as follows:

The coil heads can be raised and their formation begun before the coils are transferred completely into the stator slots.

This requires a definite comb-like structure for this device so that the comb teeth, as they move axially, will position themselves between the wedges of the dummy rotor, and interstices whereby the wedges may position themselves between these teeth and beneath a solid frusto-conical portion connecting the teeth with each other.

The coil heads can be raised progressively, which results in a special rounded shape for the comb teeth, this shape comprising two slopes joined by a skew surface determined empirically.

The coils must be able to slip smoothly from the continuous surface of the teeth to the continuous surface of the aforesaid frusto-conical solid joining portion which gives the coil head its final shape and dimensions; therefore, this frusto-conical joining portion must have a well-defined shape.

The comb device must be positioned in proper relationship with the final position of the outer tubular member so that the coil heads will be raised just at the desired position; this is ensured by means of an adequate adjustment member.

Therefore, the comb device according to this invention will consist essentially of two interfitting parts, one part forming the comb proper and the other the adjustment member, these two parts having specific shapes and features designed to fulfill the above conditions in view of properly forming the coil heads without deteriorating them.

The attached drawing forming part of this specification illustrates diagrammatically by way of example one form of embodiment of the comb device according to the invention. In the drawing.

Figure 1:
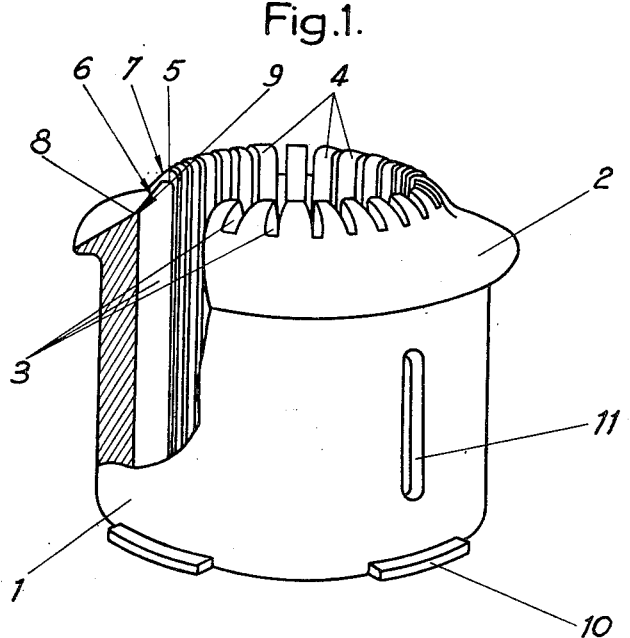
Figure 1 is an isometric, part-sectional view of the comb member proper.
Figure 2:
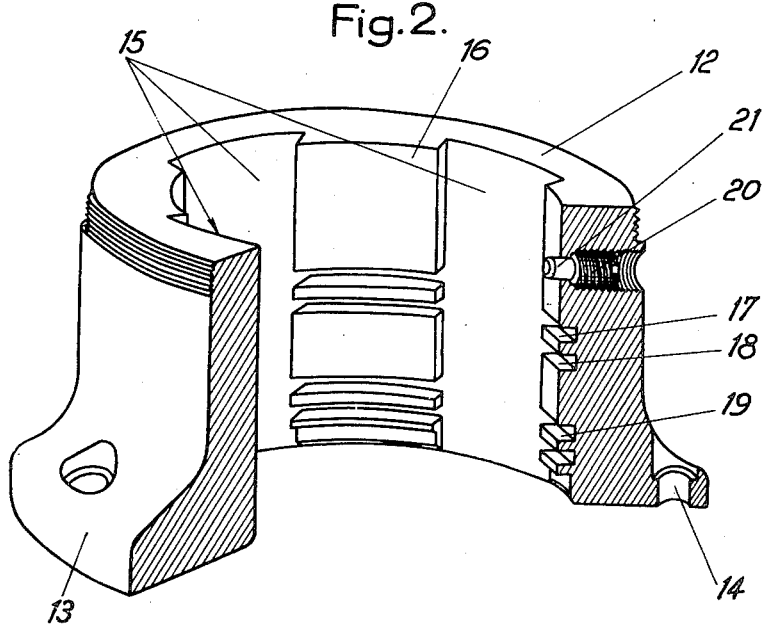
Figure 2 is a similar view showing the adjustment member intended to co-operate therewith.
Figure 7:
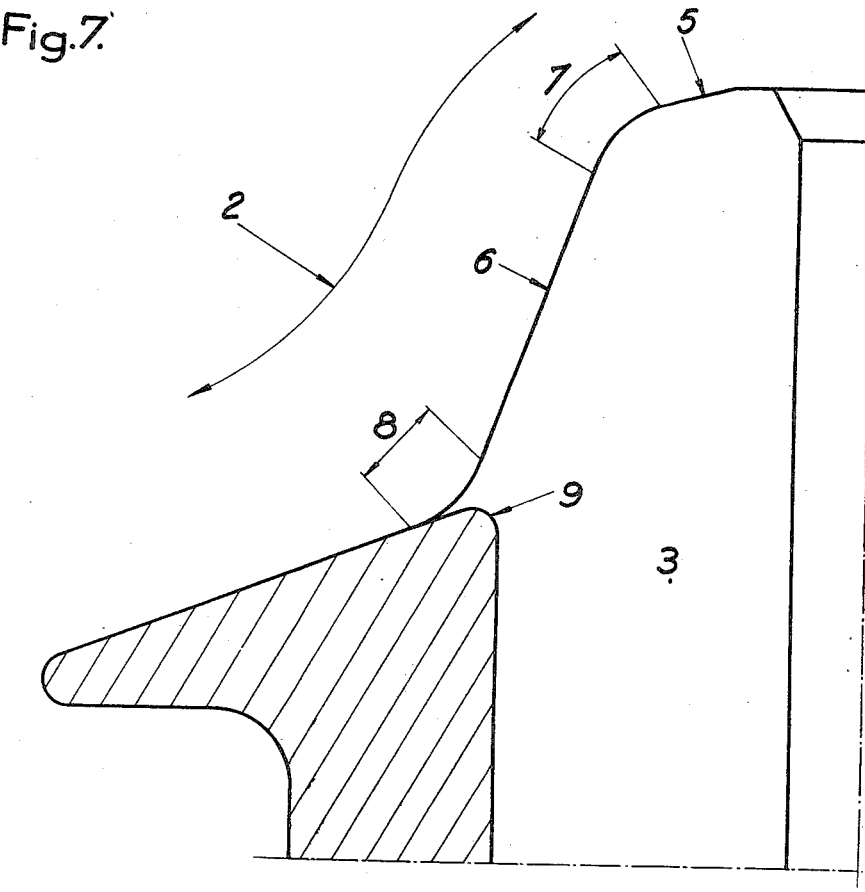
Figure 7 is a sectional view showing on a larger scale the contour of the comb teeth.
Figure 3:
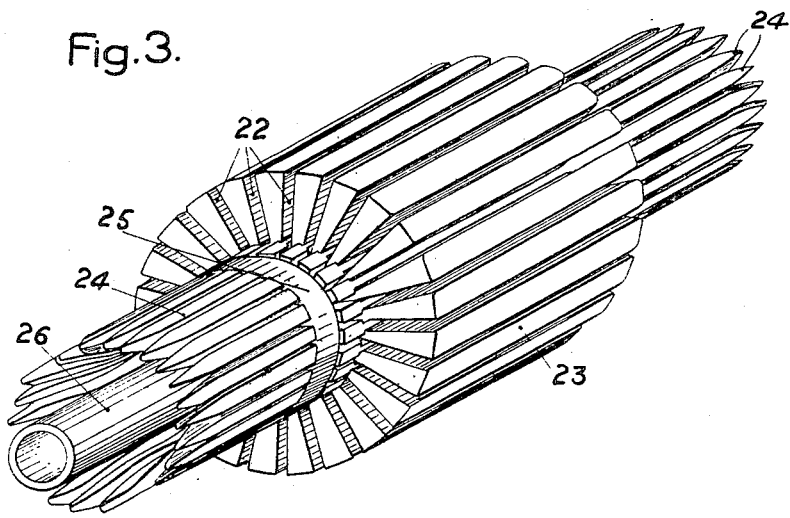
Figure 3 is an isometric view showing a dummy rotor adapted to be used with this comb in a machine for transferring the windings from said dummy rotor to the stator.
Figure 4:
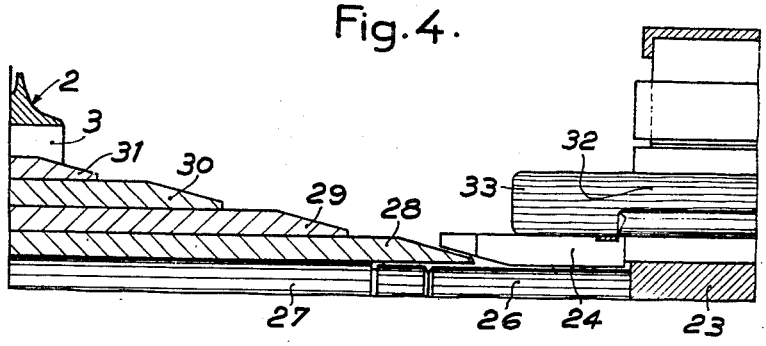
Figures 4 to 6 are fragmentary sectional views of an inserting head as described in the co-pending U. S. patent application No. 367,276 provided with a comb of the type illustrated in Figs. 1 and 2, in different operative positions thereof.
Figure 5:
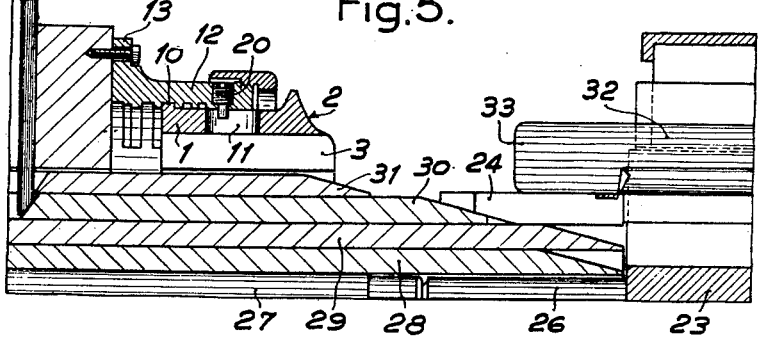

The comb member proper consists of a hollow, substantially cylindrical body 1 formed at one end with a frusto-conical portion 2 having cut therein radial grooves 3 extending along the inner wall of this body from one to the other end in spline-like fashion, as shown in Fig. 1, to permit the passage therethrough of the set of wedges of different or same lengths, however with different positions of this comb member within the adjustment member. These radial grooves constitute in the aforesaid frusto-conical portion 2 a set of teeth 4 subsequently machined to form slopes 5 and 6 which are necessary for progressively raising the coils. These two slopes are joined together by a skew surface 7 and with the surface of the solid portion of the frusto-conical portion 2 through another skew surface 8. The radial grooves 3 are joined to this surface 2 through an intersection 9 situated just at the limit of the teeth 4 to avoid catching the wires.

Besides, the cylindrical body 1 comprises on its outer surface a set of annular segment-shaped projections 10 and a slot 11 intended for coöperating with corresponding parts of the adjustment member 12, as will be made clear presently.

This adjustment member 12 consists of a substantially cylindrical body formed with a bottom flange 13 having spaced holes 14 for fastening the adjustment member through bolts or screws to the guide member of the inserting heads. It is formed along its inner wall with longitudinal, relatively large grooves 15 the width of which corresponds to that of the segmental projections 10 of the comb member; in this inner wall are also formed longitudinal splines 16 alternating with the grooves 15. On the other hand, circular grooves 17, 18, 19 (the axial position of which corresponds to the different positions of adjustment of the comb member 1 on the machine) are cut across these splines. Finally, this adjustment member is provided with a set screw 20 formed with a reduced end portion 21 adapted to engage the slot 11 of the comb member.

The comb device is adjustable as follows: the comb member proper 1 is presented in axial alignment to the adjustment member 12 so that the radial projections 10 register with the longitudinal grooves 15. Thus, the comb member may penetrate this adjustment member 12. When the axial position of the segment-like projections 10 in the adjustment member 12 corresponds to the desired adjustment, the comb member 1 is rotated so as to cause these projections 10 to engage the registering circular grooves 17, 18 or 19. This rotation is continued until the slot 11 registers with the set screw 20 and the latter is then screwed home to cause its end stud 21 to penetrate this slot 11. Thus, the comb device is locked against axial motion by the segment-like projections 10 and the circular grooves, and against rotation relative to the adjustment member 12 by the screw 20.

The axial position of adjustment can be readily changed by simply unscrewing the screw 20 and bringing the projections 10 of member 1 in alignment with the longitudinal grooves 15. Then the comb member is moved to the desired axial position until the projections 10 are again co-planar with the proper circular groove. By rotating the parts in the opposite direction the comb member 1 can be restored to its locking position, and then the parts can be locked against relative motion by screwing in the screw 20.

With this comb arrangement according to the invention the maximal flexibility of adjustment can be obtained for correctly positioning the comb member in view of inserting coils in the slots of stators of different lengths. However, in a coil inserting machine such as the one described in the co-pending U. S. pat. application Ser. No. 367,276, filed on July 10, 1953, entitled: "Inserting Head for Stator Coil Inserting Machine," this mounting can be further simplified. The member 1, while having the shape described hereabove, which is necessary for correctly forming the coil heads, may be mounted in a fixed position, through means such as the adjustment member 12, on the outermost tubular member of the telescopic set of the coil inserting machine Ser. No. 376,276, filed July 10, 1953; in this case the coil head will be formed simultaneously with the transfer of the coils from the dummy rotor to the stator, both operations ending at the same time.

The purpose is to transfer in the slots of a stator the coil 32 disposed beforehand to this end in the slots 22 of a dummy rotor 23.

Figure 6:
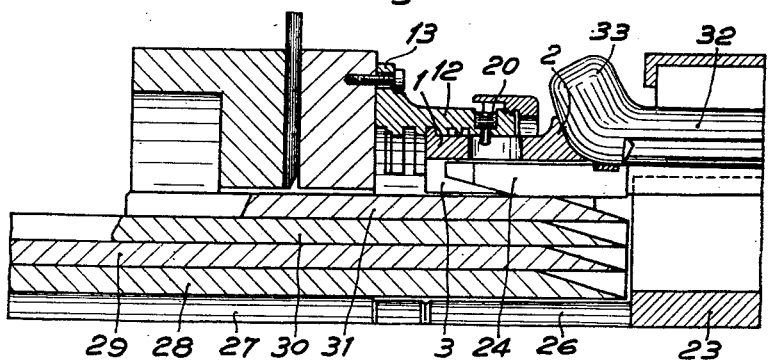

As the spindles 26 of the dummy rotor 23 are held by the central shaft 27 of the machine, a longitudinal thrust exerted on the telescopic tubes 28 to 31 will produce, through the medium of their frustoconical ends and of the tapered ends of the push members 24, a radial thrust on the coil 32 which is subsequently transferred from the slots of the dummy rotor to those of the stator. The inclined portion of the outer surface of the comb positioned on the teeth side will then become operative to shape the heads 33 of coil 32, as illustrated in Fig. 6.

What we claim is:

A comb device for a machine for winding stators of electrical machines by exerting a radial thrust on windings previously located in corresponding slots of a dummy rotor for transferring said windings to the stator slots, comprising two interfitting, substantially hollow members, the comb member proper and an adjustment member and wherein said comb member is formed at its rear end and on its outer surface with projections of circular-segmental shape, said adjustment member consisting of a hollow, substantially cylindrical body formed with a flange and provided on its inner wall with relatively large longitudinal grooves of a width slightly greater than that of said projections, longitudinal spline-like inner projections alternating with said longitudinal grooves, and circular grooves formed in said spline-like inner projections and adapted to be engaged by said projections, said circular grooves corresponding to different axial positions of said comb member.

References Cited in the file of this patent

UNITED STATES PATENTS

| | | |
|---|---|---|
| 1,308,325 | Bird | July 1, 1919 |
| 2,272,263 | Cullin | Feb. 10, 1942 |
| 2,506,173 | Polard | May 2, 1950 |